United States Patent
Henderson et al.

(10) Patent No.: US 8,899,957 B2
(45) Date of Patent: Dec. 2, 2014

(54) SYSTEM, METHOD AND APPARATUS FOR MANUFACTURING MAGNETIC RECORDING MEDIA

(75) Inventors: Clayton P. Henderson, Morgan Hill, CA (US); Tsai-Wei Wu, San Jose, CA (US); Xing-Cai Guo, Tracy, CA (US); Thomas E. Karis, Aromas, CA (US); Jeffrey S. Lille, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 517 days.

(21) Appl. No.: 12/567,277

(22) Filed: Sep. 25, 2009

(65) Prior Publication Data

US 2011/0074062 A1 Mar. 31, 2011

(51) Int. Cl.
| | |
|---|---|
| B29C 33/60 | (2006.01) |
| B29C 33/42 | (2006.01) |
| B29C 39/26 | (2006.01) |
| G11B 5/855 | (2006.01) |
| B29C 33/40 | (2006.01) |
| B29K 71/00 | (2006.01) |
| B29L 17/00 | (2006.01) |

(52) U.S. Cl.
CPC .......... B29C 33/424 (2013.01); B29K 2071/00 (2013.01); B29C 39/26 (2013.01); G11B 5/855 (2013.01); B29C 33/405 (2013.01); B29L 2017/003 (2013.01)
USPC .......................................... 425/440; 264/219

(58) Field of Classification Search
USPC .................... 264/496, 216; 425/440, DIG. 44
See application file for complete search history.

(56) References Cited

U.S. PATENT DOCUMENTS

| | | | |
|---|---|---|---|
| 6,906,115 B2 | 6/2005 | Hanazawa et al. | |
| 6,939,120 B1 | 9/2005 | Harper | |
| 7,294,294 B1* | 11/2007 | Wago et al. | 264/2.5 |
| 7,416,991 B2 | 8/2008 | Bandic et al. | |
| 7,418,902 B2 | 9/2008 | Kruijt-Stegeman et al. | |
| 2006/0021533 A1* | 2/2006 | Jeans | 101/327 |
| 2006/0216524 A1 | 9/2006 | Klun et al. | |
| 2006/0266244 A1 | 11/2006 | Kruijt-Stegeman et al. | |
| 2007/0178133 A1 | 8/2007 | Rolland | |
| 2007/0264481 A1 | 11/2007 | DeSimone et al. | |
| 2008/0000373 A1 | 1/2008 | Petrucci-Samija et al. | |
| 2008/0083484 A1 | 4/2008 | Blanchet et al. | |
| 2008/0131692 A1 | 6/2008 | Rolland et al. | |
| 2008/0131791 A1* | 6/2008 | Cho et al. | 430/5 |
| 2008/0248205 A1 | 10/2008 | Blanchet et al. | |
| 2009/0028910 A1 | 1/2009 | DeSimone et al. | |
| 2009/0061152 A1 | 3/2009 | DeSimone et al. | |

FOREIGN PATENT DOCUMENTS

JP 2009208240 A * 9/2009

OTHER PUBLICATIONS

Wakamatsu et al. JP 2009-208240 A, English Abstract Sep. 2009.*
Rolland et al., "High Resolution Soft Lithography: Enabling Materials for Nanotechnologies", 2004, Angew. Chem. 2004 116, 5920-5923.*

(Continued)

*Primary Examiner* — Galen Hauth (57) ABSTRACT

A system, method and apparatus for manufacturing high density magnetic media is disclosed. A flexible mold having a very low modulus of less than about 4 GPa is made on a rigid support. The mold nano-imprints a resist material on disks for hard disk drives. The flexible mold may comprise a perfluoropolyether with urethane acrylate end groups with a low surface adhesion from which the cured resist is easily released.

9 Claims, 4 Drawing Sheets

(56) References Cited

OTHER PUBLICATIONS

Terris et al., "Nanofabricated and self-assembled magnetic structures as data storage media", J. Phys D: Appl. Phys. 38 (2005) R199-R222, Jun. 2005.*
www.liquidia.com/technology_nanolith.html, 2 pages.
Jason P. Rolland et al., "High-Resolution Soft Lithography: Enabling Materials for Nanotechnologies," Angewandte Chem. Int. Ed., 2004, 43, pp. 5796-5799.
Dahl-Young Khang et al., "Sub-100 nm Patterning with an Amorphous Fluoropolymer," Langmuir 2004, vol. 20, No. 6, pp. 2445-2448.
UV/VIS Spectrum of Trimethyl Isocyanurate, National Institute of Standards and Technology database <www.webbook.nist.gov/chemistry>.
Albrecht et al, Magnetic Recording on Patterned Media, Joint [NA]PMRC 2003 Digest of Technical Papers, Jan. 6-8, 2003, p. 36, Monterey, CA, USA.
Choi et al, An Ultraviolet-Curable Mold for Sub-100-nm Lithography, JACS Communications, J. Am. Chem. Soc., 2004, 7744-7745, vol. 126, No. 25, Washington DC, USA.
Lalama, Flat Panel Display Manufacturing Overview, Sixteenth IEEE/CPMT Int'l Electronics Manufacturing Technology Symposium, 1994, 185-190, La Jolla, CA, USA.
McClelland et al, Nanoscale Patterning of Magnetic Islands by Imprint Lithography Using a Flexible Mold, Applied Physics Letters, 2002, vol. 81, No. 8.
Sylgard® 184, http://www.dowcorning.com/applications/search/products/Details.aspx?prod=01064291&type=PROD.

* cited by examiner

SYSTEM, METHOD AND APPARATUS FOR MANUFACTURING MAGNETIC RECORDING MEDIA

BACKGROUND OF THE INVENTION

1. Technical Field

The present invention relates in general to manufacturing magnetic media and, in particular, to an improved system, method and apparatus for manufacturing magnetic recording media.

2. Description of the Related Art

Figure 1A:
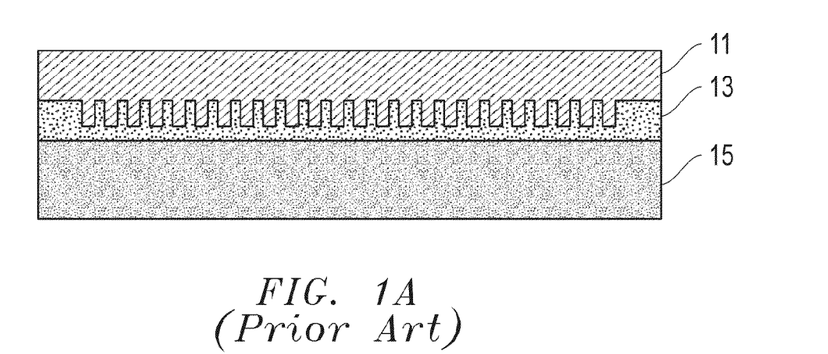
FIGS. 1A and B are schematic sectional side views of a conventional rigid mold and substrate.
Figure 1B:
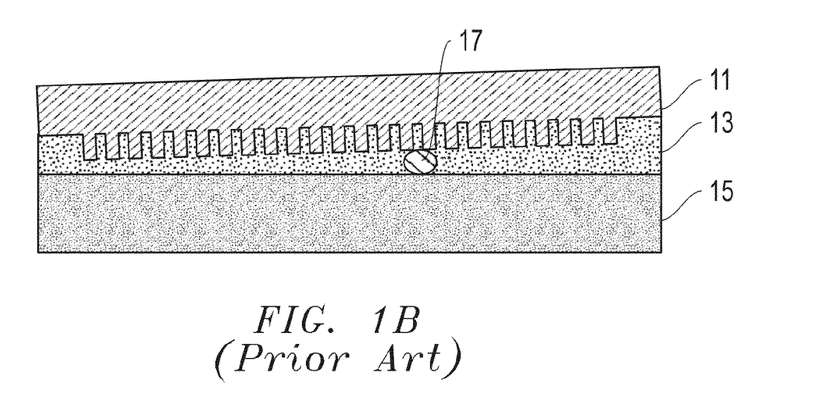

Patterned magnetic recording disk substrates have patterns that are typically formed with nano-imprint lithography processes. As shown in FIG. 1, a rigid mold 11 is provided with at least the same diameter as the disk to be patterned and is formed from a hard material, such as quartz. Curable resist 13 is applied to the rigid disk or substrate 15 to be patterned, and the rigid mold 11 is pressed onto the resist.

Under pressure, the resist flows to uniformly coat the non-patterned interstices on the disk with a uniform thickness, while also filling the recesses in the rigid mold. Radiation (e.g., UV light or heat) is applied through the quartz to cure the resist. The rigid mold is then separated from the cured resist and the disk, now coated with the patterned resist, is subsequently processed through etching and cleaning.

One problem with this technique is that when two rigid surfaces are brought together within several hundred nanometers of each other, any foreign hard particles 17 that are present between the surfaces affect the pattern formed. This is particularly true for particles having dimensions larger than the gap between the surfaces. This effect may be advantageously utilized for some applications, such as with flat panel displays in the manufacturing of thin-film transistor liquid crystal displays. Spacer particles with precise dimensions are employed to maintain a uniform cell gap.

The normal configuration for the resist layer 13 with uniform thickness between the rigid mold 11 and the substrate 15 is shown in FIG. 1A. However, unavoidable and uncontrolled particle contamination in patterned media manufacturing leads to tenting of the rigid mold. This forms a large area defect in the finished product. The defect configuration with an undesirable rigid particle 17 between the rigid mold 11 and the rigid substrate 15 is shown in FIG. 1B. The particle causes an increase in the resist film thickness. The resist film thickness variation produces features on the substrate that result in unacceptable data errors in the patterned media disk product. These drawings respectively depict the rigid mold on the substrate with a uniform film of resist, and the rigid mold on the substrate with a hard contamination particle leading to a non-uniform resist film thickness.

Flexible molds for other types of nano-imprinting have been prepared from poly dimethyl siloxane (PDMS) such as Sylgard 184. However, PDMS-based flexible molds have limited resolution and they undergo swelling in organic solvents and resists. Flexible templates for patterned media have been made from hydrocarbons and siloxanes. These designs present difficulties in separation from the cured resist, and have significant durability issues since they do not last for many molding cycles. Thus, although conventional solutions are workable for some applications, improvements in manufacturing magnetic media would be desirable.

SUMMARY OF THE INVENTION

Embodiments of a system, method, and apparatus for manufacturing magnetic recording media are disclosed. In some embodiments, soft lithography is used on a rigid support for making discrete track media (DTM) or bit patterned media (BPM) magnetic recording disks or substrates via nanoimprint lithography and dry etching. The flexible mold mitigates the effects of hard contamination particles that prevent the uniform approach of the rigid mold and disk to be patterned with the resist in between. The flexible mold accommodates contamination particles with only a local deviation in the resist thickness uniformity. In contrast, conventional soft lithography often employs molds that are laminated onto a flexible support, like Mylar film, for roll coating. None of those solutions fabricate DTM or BPM disks using a rigid support. Soft lithography for fabrication of micro electromechanical systems (MEMS) uses a small area flexible mold on a rigid support to fabricate microscale devices. Soft lithography with a flexible mold on a rigid support has not been employed in fabrication of DTM or BPM magnetic recording media.

For example, in some embodiments of soft lithography in patterned media manufacturing, a flexible mold having a Young's modulus of less than about 4 GPa is made from a rigid mold for nano-imprinting a resist material. The flexible mold may comprise a multi-functional perfluoropolyether with urethane acrylate end groups (PFPE-UA). These materials may be combined with initiators, crosslinkers, extenders and/or solvents to obtain a low viscosity resin which fills a patterned media mold to form a thin film layer. The resin formulation film can be cured by UV or heat or other means to produce a patterned media flexible mold. The mold is easily releasable from the mold and the cured resin due to its low surface energy. In addition, alignment marks also may be provided on the flexible mold.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 2-5, embodiments of a system, method and apparatus for manufacturing magnetic recording media are disclosed. We disclose the use of soft lithography with a rigid support for manufacturing patterned magnetic recording media, e.g., discrete track media (DTM) or bit patterned media (BPM) magnetic recording disks or substrates via nanoimprint lithography and dry etching. A flexible mold mitigates the effects of hard contamination particles that prevent the uniform approach of the rigid mold and disk to be patterned with the resist in between. The flexible mold has a low Young's modulus and has a rigid backing material for nano-imprinting a resist material. The flexible mold may comprise a perfluoropolyether with urethane acrylate end groups (PFPE-UA). As shown in FIG. 3B, the mold has topographical features with predetermined width (W) and depth (D) that are reproduced in the imprints.

Figure 2:
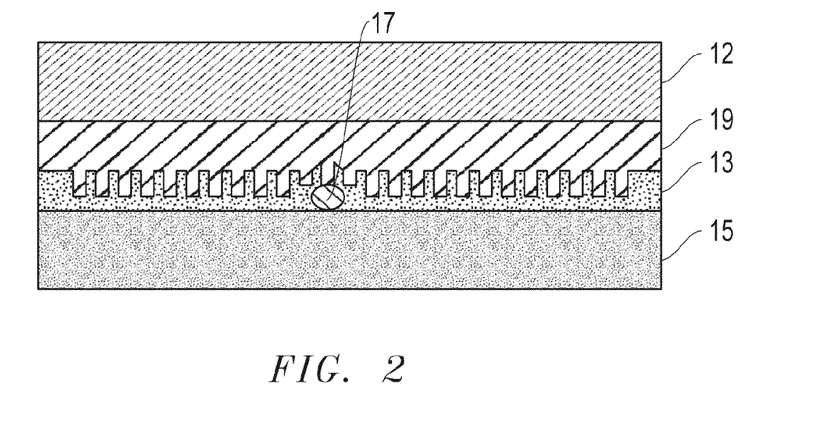
FIG. 2 is a schematic sectional side view of a flexible mold on a rigid support showing how the flexible mold deforms around a rigid particle on the substrate.

To overcome problems associated with conventional solutions, a rigid mold can be reproduced in a flexible polymer 19 (FIG. 2) to form a flexible mold. The flexible mold deforms around the particle 17 and alleviates the size of the defect created by particle 17 to accommodate surface non-uniformities. FIG. 2 depicts a schematic drawing of a flexible mold 19 on a rigid support 12 with a hard contamination particle 17 on the substrate 15. This illustration shows how the flexible mold deforms locally to prevent a long range disturbance to the film thickness of the resist 13.

For example, in one experiment, replication of grooves in a recordable compact disk (CD-R) substrate was tested with a commercial mold casting resin. For the mold, CDR substrates had their silver reflective layer removed by cooling with liquid nitrogen which delaminated the metallic layer from the polycarbonate. The substrates were cleaned with isopropanol (IPA) and methanol (MeOH). For a release layer, some of the substrates were dip-coated with Z-tetraol. Z-tetraol is a perfluoropolyether with 2 hydroxyl groups on each end, and the molecular weight was 2000 Daltons. The water contact angle was increased from 75 to 100° by this release coating. Other substrates were dip-coated with a UV-cured perfluoropolyether diacrylate (PDA-Z). The water contact angle was increased to 105° by this release coating. Commercial mold casting resins were obtained from Smooth-On Corp. These are listed in Table. 1.

TABLE 1

Commercial mold casting resins evaluated for use as flexible molds for patterned media.

| Compound | Type | Shore Hardness | Observations |
|---|---|---|---|
| Mold Max 15T | Silicone (rubber, tin cured)-fine detail, translucent | A-15 | Low viscosity, good separation w/PDA-Z, no bubbles, very flexible |
| Sorta-Clear 40 | Silicone (rubber, platinum catalyst) | A-40 | Good separation w/Ztetraol, some bubbles |
| Clear-Flex 50 | Polyurethane (rubber)-UV resistant | A-50 | Low viscosity, few bubbles, difficult separation w/PDA-Z |
| Ecoflex 5 | Silicone (rubber) | A-5 | Difficult separation w/Ztetraol, did not appear to replicate as well |
| Ecoflex 00-10 | Silicone (rubber) | 00-10 | Good separation w/PDA-Z, too flexible |
| Vytaflex 10 | Polyurethane (rubber) | A-10 | No separation w/Ztetraol, remained sticky after cure |
| Crystal Clear 202 | Urethane (plastic)-UV resistant | D-80 | Difficult separation w/PDA-Z, too rigid |

In one embodiment of a procedure and method, approximately 10 to 20 grams of liquid rubber was prepared according to the instructions for each. Several drops of each liquid rubber were squeezed between one-inch diameter, flat poly methyl methacrylate (PMMA) disks on the grooved side of the CD-R as a rigid mold. These were then allowed to cure overnight. The resin cured between the PMMA disk and the CD-R is the flexible mold, and the PMMA disk is the rigid support. The cured resin on the support was separated from the CD-R mold, and revealed a patterned side of the rubber. These samples exhibited rainbow colors from the diffraction pattern of the grooves that were on the original CD-R mold.

The mold casting resins were able to reproduce the features of the CDR. They were separated by peeling, even without a release layer to lower the surface energy. Three resins from these trials were selected for further testing by replicating a discrete track media pattern rigid mold in a silicon wafer. In this experiment, the most easily removable resin, and the one that appeared to provide the best replication was Clear Flex 50 (CF-50).

Spin coating of a thin flexible mold film onto a silicon wafer also was tested. The neat resin is too viscous to spin coat. The CF-50 resin was diluted with isopropyl alcohol to 67 wt % or 50 wt % concentration and spin coated at 1,000 or 3,000 rpm after filtration through a 0.45 micron membrane filter. Reasonably smooth films were obtained with the 50% concentration in IPA and 3K rpm spin speed.

Quartz wafers coated with release layers of fluorinated triethoxy silane monolayer, or perfluoropolyether, as well as uncoated wafers were pressed onto the uncured film of spin coated CF-50 resin. After the resin cured, none of the wafers could be separated from the film on the silicon. A thin layer of resist was cured on top of the cured CF-50 film, but the resist could not be separated from the cured CF-50. In another test, 50% CF-50 in IPA was filtered and spin coated onto a five-inch silicon wafer with a test pattern mold. The cured CF-50 could not be separated from the silicon.

From these results, it was determined that a release agent enhanced the use of the hydrocarbon-based casting resin for the flexible mold application. With a poly dimethyl siloxane (PDMS) flexible mold, the same release problems were reported in the literature and have been overcome by the use of perfluoropolyether acrylates (PFPE-UA). A PFPE-UA (Solvay Solexus Corp., Fluorolink FLK MD700) was combined with 0.5% or 4% of Ciba Irgacure 651 photoinitiator in Vertrel XF (with a trace of acetone). Several drops of this solution were placed on a silicon wafer. The film was cured in UV for as long as one hour, but the resin remained tacky. After three days in an oven at 100° C., a small bit of rubber was formed at the edge of the wafer containing the higher amount of initiator. The free radical curing chemistry is inhibited by residual acetone.

The following example demonstrates embodiments of a small scale reproduction of the process to manufacture patterned media substrates from a flexible mold on a rigid support starting with an e-beam test pattern mold in rigid silicon. Several one-inch diameter rigid UV transparent quartz support wafers (G.M. Associates GM-7500-01) were cleaned in a UV ozone cleaner for 5 minutes. Adhesion promoter was applied to the cleaned wafers by dip coating in a 1-2% solution of methacryloxypropyltrimethoxy silane (Gelest SIM6487.4) in ethanol with a trace of water. Excess solution was blown from the wafers with clean dry air. A solution of PFPE-UA and photoinitiator was prepared in a volatile solvent as follows. Solvay-Solexis Fluorolink FLK5105X PFPE-UA was dissolved at 50 wt % in DuPont Vertrel XF, and 0.7% acetone by Vertrel weight was added to facilitate dissolution of the photoiniator. The photoiniator was 2 wt % of Ciba Irgacure 651 by weight of Fluorolink. Several drops of the PFPE-UA solution were placed on an e-beam test pattern mold with etched submicron lines and holes made in a five-inch silicon wafer. The solvent was evaporated to spread the PFPE-UA into a film on the test pattern mold in a vacuum oven (800 mbar/65 C, 1 hour). The quartz support wafer coated with the adhesion promoter was pressed onto the film of PFPE-UA. The PFPE-UA was cured through the quartz support wafer in a UV exposure tool. The quartz support wafer coated with the cured flexible mold layer was peeled from the mold. There was clean separation with low adhesion between the cured PFPE-UA and the silicon wafer test pattern mold. The flexible mold layer was 100 microns thick and was bonded to the quartz support wafer by the adhesion promoter.

The surface energy of the FLK5105X flexible mold was 17.4 mN/m (calculated from measured water and hexadecane contact angles). The indentation modulus and hardness were measured with an Ultra Nano-indentation tester (CSM Instruments) with a Berkovich indenter (assumed Poisson's ratio 0.5). The mechanical properties of the cured PFPE-UA flexible mold of this example are listed in Table 2. The indentations completely recovered within seconds following the indenter load removal.

TABLE 2

Nanonindentation properties of the flexible mold from Fluorolink FLK5105X measured at two different depths in the film.

| maximum load (mN) | maximum Depth (microns) | indentation hardness (MPa) | indentation modulus (MPa) |
|---|---|---|---|
| 1 | 5 | 3.4 | 20 |
| 5 | 12 | 1.0 | 10 |

Figure 4A:
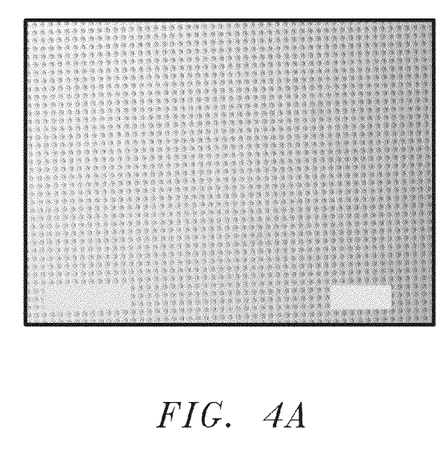
FIG. 4A is an optical micrograph of an embodiment of a test pattern mold in accordance with the invention.
Figure 4B:
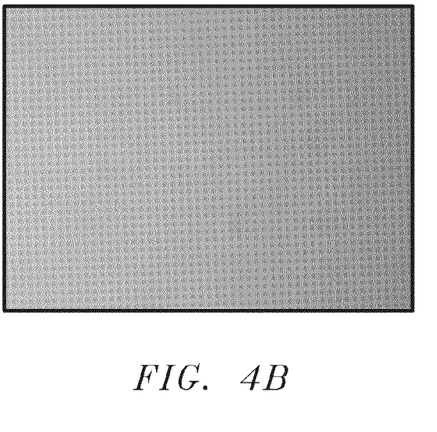
FIG. 4B is an optical micrograph of an embodiment of a PFPE-UA flexible mold replica of the test pattern in accordance with the invention.

An optical micrograph of the original rigid silicon test pattern mold is shown in FIG. 4A, and an optical micrograph of the cured PFPE-UA flexible mold made from the test pattern mold is shown in FIG. 4B. The flexible mold topography is the negative image of the original test pattern. A model resist was prepared to demonstrate replication of the test pattern from the flexible mold. The model resist was TMPTA (trimethylol propane triacrylate, Aldrich 246840) with 2% Ciba Irgacure 651 by weight of TPMTA and 1.4% acetone to facilitate dissolution of the photoinitiator. A smooth silicon wafer was cleaned in a UV ozone cleaner for five minutes. Adhesion promoter was applied to the cleaned wafer by dip coating in a 1-2% solution of methacryloxypropyltrimethoxy silane (Gelest SIM6487.4) in ethanol with a trace of water. Excess solution was blown from the wafer with clean dry air. Several drops of the TMPTA resist solution were placed on the smooth silicon wafer. The solvent was evaporated in a vacuum oven (800 mbar/65° C., one hour).

Figure 4C:
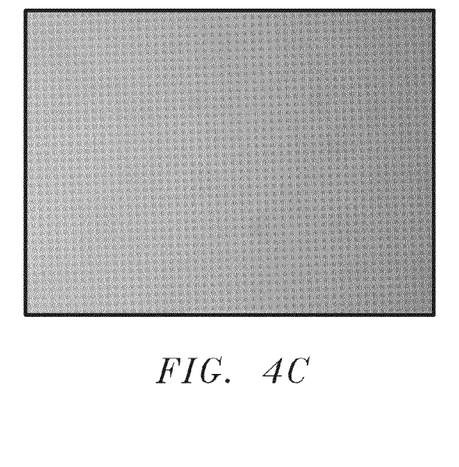
FIG. 4C is an optical micrograph of an embodiment of a resist replica of the test pattern on the flexible mold in accordance with the invention.

The PFPE-UA flexible mold on the rigid quartz support wafer was pressed onto the film of TMPTA on the silicon wafer. The TMPTA was cured through the quartz support and flexible mold in a UV exposure tool. The silicon wafer was separated from the flexible mold. There was clean separation with low adhesion between the PFPE-UA flexible mold and the photoresist. The cured TMPTA resist layer was 50 microns thick and was bonded to the silicon wafer by the adhesion promoter. An optical micrograph of the test pattern in the photoresist is shown in FIG. 4C. This process reproduced the features on the original rigid silicon test pattern mold into a resist using a PFPE-UA flexible mold held on a rigid UV transparent support.

Figure 5A:
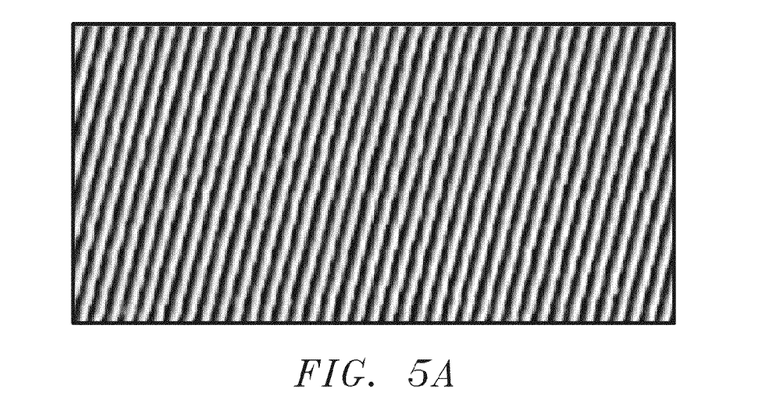
FIG. 5A is an AFM image of an embodiment of a DTM rigid quartz mold in accordance with the invention.
Figure 5B:
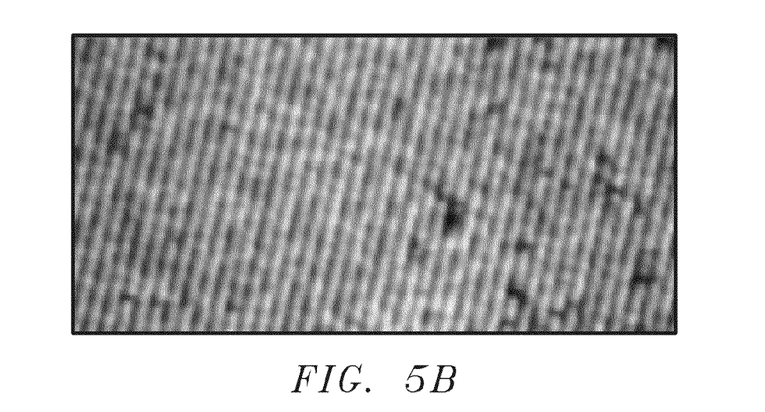
FIG. 5B is an AFM image of an embodiment of a PFPE-UA flexible mold replica of the DTM rigid quartz mold in accordance with the invention.

The next example demonstrates an embodiment of a small scale reproduction of the process to manufacture patterned media substrates from a flexible mold on a rigid support starting with a DTM mold in rigid quartz. The DTM quartz mold was cleaned in an oxygen plasma ashing tool (TePla M4L etcher, TePla America). The PFPE-UA formulation and procedure was the same one used in the previous example, except that the DTM mold was substituted for the silicon test pattern mold. The DTM mold track pitch was 50 nm and the groove depth was 50 nm. An AFM image of the DTM mold is shown in FIG. 5A. The corresponding AFM image of the flexible mold replica of the DTM quartz mold is shown in FIG. 5B. The flexible mold pattern topography is inverted relative to the original DTM mold pattern topography.

Figure 5C:
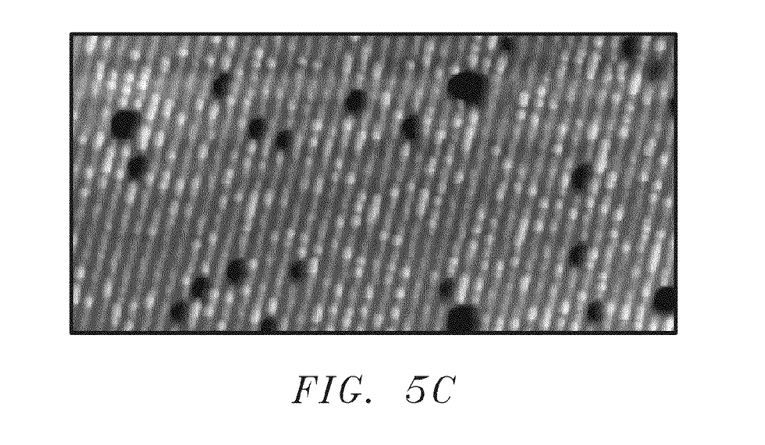
FIG. 5C is an AFM image of an embodiment of a resist replica of the test pattern on the flexible mold in accordance with the invention.

The PFPE-UA flexible mold on the rigid quartz wafer support was replicated in resist on a magnetic recording disk. A commercial resist was uniformly deposited on a magnetic disk surface treated with a commercial adhesion promoter. The flexible mold on the quartz support was pressed onto the film of resist, and the resist was cured through the quartz. The cured resist on the disk was separated from the PFPE-UA flexible mold, leaving the pattern embossed in the cured resist on the disk. An AFM image of the cured resist pattern is shown in FIG. 5C.

The following example demonstrates a small scale reproduction of the process to manufacture patterned media substrates from a flexible mold on a rigid support starting with an e-beam test pattern mold in rigid silicon, or with a DTM mold in rigid quartz using four different grades of Fluorolink and an internal release agent. Several one-inch diameter rigid UV transparent quartz support wafers (G.M. Associates GM-7500-01) were cleaned in a UV ozone cleaner for ten minutes. Adhesion promoter was applied to the cleaned wafers by dip coating in a 1-2% solution of methacryloxypropyltrimethoxy silane (Gelest SIM6487.4) in ethanol with a trace of water. Excess solution was blown from the wafers with clean dry air. Solutions of PFPE-UA and photoinitiator were prepared in a volatile solvent. Solvay-Solexis Fluorolink FLK5110X, FLK5105X, FLK5112X, and MD700 PFPE-UA were each separately dissolved at 50 wt % in DuPont Vertrel XF, and 1% acetone by Vertrel weight was added to facilitate dissolution of the photoinitiator. The photoinitiator was 1 wt % of Ciba Irgacure 651 and 1% of Ciba Irgacure 819 by weight of Fluorolink. Additionally, 1 wt % of DuPont Zonyl 8857A by weight of Fluorolink was included to facilitate release of the PFPE-UA flexible mold from the original rigid mold and of the resist from the PFPE-UA flexible mold after cure. The solutions were filtered through a 0.2 micron PTFE membrane to remove solid particles. Several drops of each PFPE-UA solution were placed on the rigid mold. The solvent was evaporated to spread the PFPE-UA into a film on the mold in a vacuum oven (800 mbar/65 C, 15 to 30 min). The rigid quartz support wafer coated with the adhesion promoter was pressed onto the film of PFPE-UA. The PFPE-UA was cured through the quartz support wafer in a UV exposure tool. The quartz support along with the attached flexible mold layer was separated from the mold. The flexible mold layer remained bonded to the rigid quartz support wafer by the adhesion promoter.

There was improved release with low adhesion between cured PFPE-UA and the original rigid mold with the Zonyl 8857A internal release agent. The thickness of the PFPE-UA flexible mold layer on the quartz support wafer is listed in Table 3. The Fluorolink 5110X appeared too brittle to use as a flexible mold by itself. A model resist was prepared to demonstrate replication of the test pattern on the flexible mold. The model resist was TMPTA (trimethylol propane triacrylate, Aldrich 246840) with 1% Irgacure 651 and 1% Irgacure 819 by wt of TPMTA. A smooth silicon wafer was cleaned in a UV ozone cleaner for 5 minutes. Adhesion promoter was applied to the UV ozone cleaned wafer by dip coating in a 1-2% solution of methacryloxypropyltrimethoxy silane (Gelest SIM6487.4) in ethanol with a trace of water. Excess solution was blown from the wafer with clean dry air. Several drops of the TMPTA resist solution were placed on the smooth silicon wafer. The PFPE-UA flexible mold on the rigid quartz support wafer was pressed onto the film of TMPTA on the silicon wafer. The TMPTA was cured through the quartz support in a UV exposure tool. The cured resist on the silicon wafer cleanly separated from the PFPE-UA flexible mold. The cured TMPTA resist layer remained bonded to the silicon wafer by the adhesion promoter. The Zonyl 8857A internal release agent improved the release between the PFPE-UA flexible mold and the resist except with the FLK5105X which stuck to the cured resist even with the Zonyl additive. The process reproduced the features from the original test mold into the resist using the flexible PFPE-UA mold held on a rigid UV transparent support. Both the MD700 and the FLK5112X were selected as suitable candidates for the PFPE-UA flexible mold. From micrographs taken on a 500 nm hole pattern of the resist replica, the MD700 looked better than the FLK5112X.

TABLE 3

Thickness and surface energy of the PFPE-UA flexible mold layer on the rigid quartz support wafers.

| Fluorolink sample number | original mold | film thickness (um) | surface energy (mN/m) |
|---|---|---|---|
| 5112X | Si pattern | 80 | 17.3 |
| MD700 | Si pattern | 60 | 17.6 |
| 5112X | DTM | 70 | — |
| MD700 | DTM | 60 | — |

In some embodiments, PFPE-UA materials are combined with initiators, cross-linkers, extenders, and/or solvents to obtain a low viscosity liquid that fills a patterned media mold as a thin film. The film can be cured by UV, heat or other means to produce a patterned media flexible mold. The PFPE-UA based mold is easily releasable from the mold due to its low surface energy. A coupling agent or adhesion promoter can be applied to bond it to a rigid backing plate, possibly made from quartz, or some type of polymeric material that is rigid and UV transparent. An opaque backing plate may be used for thermal, peroxide, epoxide or other chemical methods of curing.

The backing plate may comprise UV-transparent quartz to allow through exposure of the photoresist. The elastomeric, PFPE-UA based flexible mold can then be sandwiched with a resist layer in between with a magnetic recording disk substrate which is to be coated with the patterned resist. UV light or heat may then be used to cure the resist. The PFPE-UA mold is separated, leaving the patterned resist behind on the substrate. The substrate is etched, cleaned, and further processed into a patterned magnetic recording disk. The process is then repeated with, e.g., robotic automation to pick and place the substrates, and deposit a cure the resist, using the same flexible PFPE-UA mold for many thousands of nearly defect-free substrates.

Figure 3A:
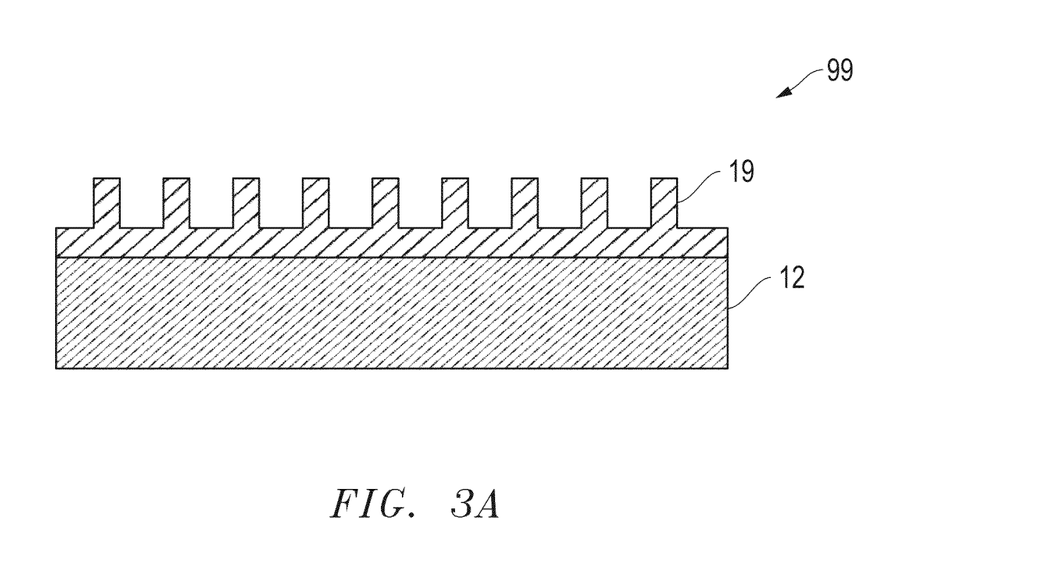
FIG. 3A is a sectional view of one embodiment of a mold for patterned media substrate manufacturing made with a flexible mold on a rigid support.
Figure 3B:
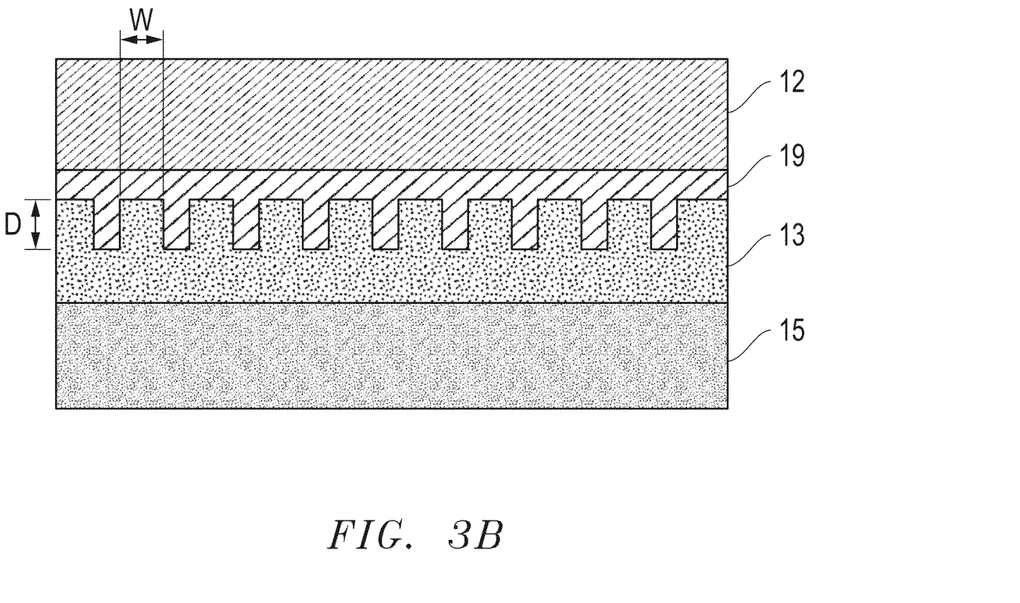
FIG. 3B is a closed configuration with resist between the flexible mold and the substrate during patterned media substrate manufacturing.

As an example, some embodiments provide a template 99 as shown in FIGS. 3A and 3B. The template comprises a flexible imprint mold 19 on a rigid support 12. In an imprint lithography tool, the template transfers the inverse image that is in the mold to the imprint resist 13 on a substrate 15. Furthermore, the flexible mold 19 cleanly separates from the imprint resist 13 after the resist is cured without leaving behind residual resist on the mold 19.

In some embodiments, an imprint mold for manufacturing magnetic recording media comprises a rigid support material that is UV-transparent and has a flat surface. A flexible mold layer is located on the rigid support material and has a Young's modulus of less than about 4 GPa. The flexible mold layer comprises a perfluoropolyether (PFPE) material. The rigid support material may be flat and UV-transparent in a wavelength range of 130 to 400 nm, or in a range of 250 to 400 nm. The imprint mold may further comprise an adhesion layer on the flat surface, and the flexible mold layer on the adhesion layer. The flexible mold layer may further comprise alignment targets for aligning the imprint mold with a substrate based on the alignment targets. The rigid support material may comprise quartz, and the flexible mold layer may have a topography that forms a topography pattern with dimensions that are precise such that one standard deviation is less than 1 nm. The topography may comprise grooves and holes having an aspect ratio of depth to width between 0.5 and 2. The PFPE material also may have urethane acrylate (UA) end groups, and the flexible mold layer may have a surface energy of less than 20 mN/m.

In still other embodiments, a system for imprint mold manufacturing of magnetic recording media comprises an imprint mold having a rigid support material that is UV-transparent and has a flat surface. The flexible mold layer is on the rigid support material and has a Young's modulus of less than about 4 GPa, with the flexible mold layer comprising a fluorohydrocarbon polymer. The imprint mold is placed in contact with a substrate having a void-free resin formulation to form a topography on the substrate. The flexible mold layer may further comprise optically visible alignment targets that are placed in contact and aligned with the substrate based on the optically visible alignment targets. The imprint mold may be removed from the substrate with resin remaining on the substrate with a compliment of the topography located on the imprint mold. The fluorohydrocarbon polymer comprising the flexible mold layer may have one or more urethane acrylate (UA) or acrylate pendant and/or end groups. The flexible mold layer also may be blended with at least one of mono-, di-, tri-, tetra-, and poly-functional fluorohydrocarbon acrylates or urethane acrylates. The flexible mold layer may be made using any other type of reactive groups that react to polymerize, such as epoxides or many others known to those skilled in the art. The imprint mold may imprint into resist, allows cure of the resist, and release from the resist without loss of the topography.

This written description uses examples to disclose the invention, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. While the invention has been shown or described in only some of its forms, it should be apparent to those skilled in the art that it is not so limited, but is susceptible to various changes without departing from the scope of the invention.

We claim:

1. A system for imprint mold manufacturing of magnetic recording media, comprising:
    an imprint mold having a rigid support material that is UV-transparent in a wavelength range of 250 to 400 nm and has a flat surface, and a flexible mold layer on the rigid support material and having a modulus of at least 10 MPa, and a Young's modulus of less than about 4 GPa, the flexible mold layer comprising a fluorohydrocarbon polymer;
    placing the imprint mold in contact with a substrate having a void-free resin formation to form a topography on the substrate; and
    the flexible mold layer has optically visible alignment targets that are placed in contact and aligned with the substrate based on the optically visible alignment targets, and the flexible mold layer has a topography that forms a pattern that is precise such that one standard deviation of patterned dimensions is less than 1 nm.

2. A system according to claim 1, wherein the rigid support material is UV-transparent in a range of 130 to 400 nm, and the topography comprises grooves and holes having an aspect ratio of depth to width between 0.5 and 2.

3. A system according to claim 1, wherein the flexible mold layer is cured by UV or heat, and has a surface energy of less than 20 mN/m.

4. A system according to claim 1, further comprising removing the imprint mold from the substrate with resin remaining on the substrate with a compliment of the topography located on the imprint mold.

5. A system according to claim 1, wherein the fluorohydrocarbon polymer has urethane acrylate (UA) end groups.

6. A system according to claim 1, wherein the flexible mold layer comprises perfluoropolyether acrylate.

7. A system according to claim 6, wherein the flexible mold layer is blended with at least one of mono-, di-, tri-, tetra-, and poly-functional fluorohydrocarbon with at least one acrylates, urethane acrylates pendant and end groups.

8. A system according to claim 1, wherein the imprint mold imprints into resist, allows cure of the resist, and releases from the resist without loss of the topography.

9. A system for imprint mold manufacturing of magnetic recording media, comprising:
    an imprint mold having a rigid support material with a flat surface and is UV-transparent in a wavelength range of 250 to 400 nm, and a flexible mold layer on the rigid support material and having a modulus of at least 10 MPa, and a Young's modulus of less than about 4 GPa, the flexible mold layer comprising a fluorohydrocarbon polymer and having a topography with a pattern of grooves and holes having an aspect ratio of depth to width between 0.5 and 2, and the pattern is precise such that one standard deviation of patterned dimensions is less than 1 nm;
    the flexible mold layer comprises perfluoropolyether acrylate and is blended with at least one of mono-, di-, tri-, tetra-, and poly-functional fluorohydrocarbon with at least one acrylate, urethane acrylate pendant and end group;
    placing the imprint mold in contact with a substrate having a void-free resin formation to form a topography on the substrate;
    the flexible mold layer is cured by UV or heat, has a surface energy of less than 20 mN/m, and has optically visible alignment targets that are placed in contact and aligned with the substrate based on the optically visible alignment targets; and
    removing the imprint mold from the substrate with resin remaining on the substrate with a compliment of the topography located on the imprint mold, such that the imprint mold imprints into the resin, allows cure of the resin, and releases from the resin without loss of the topography.

* * * * *